Patented July 5, 1927.

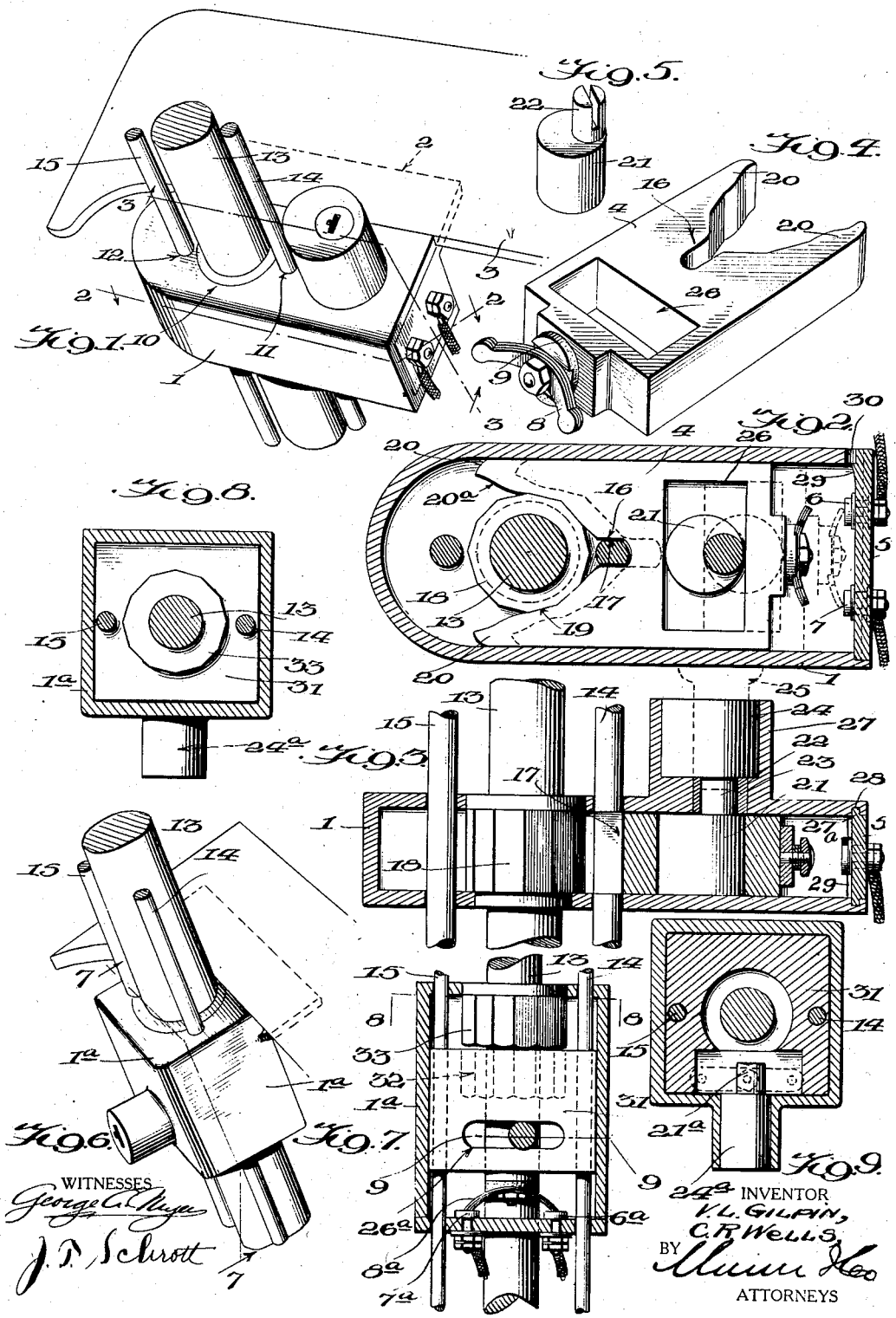

1,635,080

UNITED STATES PATENT OFFICE.

VICTOR L. GILPIN AND CHESTER R. WELLS, OF BALTIMORE, MARYLAND; SAID WELLS ASSIGNOR TO SAID GILPIN.

AUTOMOBILE LOCK.

Application filed July 6, 1925. Serial No. 41,829.

This invention relates to improvements in automobile locks, and it consists of the constructions, combinations and arrangements herein described and claimed.

One of the foremost objects of the invention is to provide an extremely simple lock construction for the purpose of securing the steering post of an automobile against turning and simultaneously to break certain important electrical circuits for example, the ignition circuit.

Another object of the invention is to provide an antomobile lock in which a distinctive but appropriate key is employed to turn an appropriate eccentric for the purpose of actuating the lock bolt, it being the lock bolt that controls the ignition or other particular circuit or circuits involved.

Other objects and advantages appear in the following specification, reference being had to the accompanying drawing, in which Figure 1 is a perspective view illustrating the application of the improved automobile lock.

Figure 2 is a horizontal section taken substantially on the line 2—2 of Figure 1.

Figure 3 is a vertical section taken on the line 3—3 of Figure 1.

Figure 4 is a detail perspective view of the locking bolt.

Figure 5 is a detail perspective view of the revoluble eccentric.

Figure 6 is a detail perspective view of a modified and even more simplified form of the invention.

Figure 7 is a detail vertical section taken substantially on the line 7—7 of Figure 6.

Figure 8 is a cross section taken on the line 8—8 of Figure 7.

Figure 9 is a detail cross section taken on the line 9—9 of Figure 7.

Reference may be had to our co-pending application for Letters Patent on automobile locks, filed May 25, 1925, Serial #32690. In that application, as in this, the purpose of the invention is to produce a substantially simultaneous control of both the steering post and the ignition circuit of an automobile or other motor vehicle. In that application use was made of a combination lock which requires the knowledge of a certain combination by the operator before the automobile lock can be actuated to release the steering post and close the electrical circuit. In the interest of simplification, the present invention dispenses with the combination lock and employs a particular key. The internal structure of the lock is also simplified to the extreme, thereby making the lock readily adaptable to a wide variety of purposes wherein the reduction of expense is a consideration.

Two modifications are disclosed in this application, and while these involve a slightly different structure yet principles of operation is identical in both instances. In Figures 1, 2 and 3 the casing 1 is made of steel or other suitable material, and is provided with an appropriate flange 2 by means of which the casing can be secured to and beneath the instrument board 3. The manner of mounting the casing is susceptible to a rather wide variety of means because it is obvious that the instrument board 3 need not be solely relied upon as the mounting for the lock. In practice it is intended that any appropriate mounting or support shall be employed.

One end of the casing 1 is open to permit introduction of the locking bolt 4. The open end of the casing is ultimately closed by a plate 5 which, incidentally, carries the insulated contacts 6 and 7 of the ignition or other electrical circuit which is intended to be controlled. To this end the locking bolt 4 carries the contactor bridge 8. The bridge is insulated from its carrier at 9 and upon engaging the contacts closes the circuit mentioned.

Openings 10, 11 and 12 admit the steering post 13, throttle rod 14 and spark rod 15 of a familiar type of automobile for which the lock is primarily intended. The throttle and spark rods merely pass through the casing 1 (Figs. 2 and 3) and ordinarily will play no part in the functioning of the lock. However, it is anticipated that inasmuch as the locking bolt 4 has a recess at 16 in order to get around the throttle rod 14 use may be made of this circumstance by flattening the throttle rod at 17 (or making it non-circular otherwise) and thereby provide a lock for the throttle rod as well as the steering post and ignition circuit.

Mounted upon the steering post 13 is a non-circular head 18. This head is formed upon or applied to the steering post in any appropriate manner. It is shown as having twelve sides, but in practice may have only so many as may be deemed expedient. The non-circular head is intended to be engaged by certain walls of the bifurcation 19 in the end of the locking bolt. This bifurcation produces a pair of jaws 20.

The operation of shifting the bolt 4 in the casing 1 is performed by rotation of an eccentric 21 on a short shaft 22 which extends into the barrel 23 of a lock 24. The lock is operated by a particular key 25 which the operator must carry as he does the usual ignition, transmission or other lock key. Upon turning of the key 25 the shaft 22 is made to turn resulting in rotation of the eccentric 21 in the oblong slot 26 on the bolt, thereby either shifting the bolt to the full line engaging position in Figure 2 or to the dotted line disengaging position. The cylinder of the lock is permanently imbedded in a boss 27 that is integral with the casing 1.

Various methods may be employed to secure the closure plate 5 against the open end of the casing 1. According to the method shown the closure plate 5 is equipped with tongues 27ª that ride in parallel grooves 28 in the transverse portion of the casing opening. A slight rib 29 (Fig. 2) near one edge of the closure plate is intended to expand against the interior of the casing after the plate has been forced in place whereby to hold the closure plate in position. A narrow opening 30 is necessary to admit the contacts 7 as the closure plate 5 is slid in place.

In Figures 6 to 9 inclusive the steering post 13, throttle rod 14 and spark rod 15 pass through the casing 1ª as before, but the casing in order to accommodate the non-circular plug or bolt 31, is now of non-circular tubular formation instead of that of a substantial rectangle as in Figure 2. In both instances the locking function is performed after a reciprocatory motion of the bolt.

In Figure 7 the bolt 31 has a non-circular wrench recess 32 to match the configuration of the non-circular head 33 affixed to the steering post 13. The throttle and spark rods pass through the bolt 31 (Figs. 7 and 9) and would tend to assist in preventing turning of the bolt were it not that the non-circular formation of the bolt itself through engagement of the corresponding non-circular formation of the tubular casing perform that function.

A slot 26ª in the plug or bolt 31 admits the eccentric 21ª of the lock 24ª as before so that turning of the lock (not shown) causes turning of the eccentric 21ª and the resulting up or down movement of the bolt 31 within the casing 1ª. The bolt carries an insulated contactor 8ª which is engageable with the contacts 6ª and 7ª of the ignition circuit.

The operation is readily understood. It has already been pointed out that the mode of application of the casing 1 or 1ª will be such that the lock will be held perfectly secure whether the attachment be made to the instrument board (as shown in the drawings) or otherwise. In both modifications the steering post 13 and the throttle and spark rods 14 and 15 pass through the lock casing, but with the possible exception noted in Figure 2 perform no part of the operation of the lock. In Figure 2 the throttle rod is shown as made non-circular at 17 so that turning may be prevented when the walls of the recess 16 engage it while the bolt 4 is in the locked position.

It is to be noted that in both instances the bolts 4 and 31 are guided by the interior wall surfaces of the casing 1 and 1ª. The fitting of the bolt is so close that very little lost motion is involved, but at the same time the bolt is freely reciprocable upon turning of the eccentric 21 and 21ª in the slot 26 and 26ª.

Upon turning the key (see for example 25 in Figure 3) in one direction the bolt 4 is slid so that the recess 19 of the jaws 20 engage the non-circular head 18 of the steering post 13. The contactor 8 is at the same time disengaged from the contacts 6 and 7 to thereby open the ignition circuit. The wires of this circuit will in practice be armored in such a manner that they are not readily accessible. But even if the ignition circuit should be successfully short circuited the bolt 4 would nevertheless hold the steering post from turning and make it a difficult matter to get away in the automobile. The foregoing functions occur in respect to the modified lock in Figure 7.

Another feature of importance occurs in this, that the jaws 20 of the bolt 4 have outwardly flared portions 20ª which are intended to cause such preliminary turning of the steering post 13 as will bring the head into appropriate registration with the walls of the wrench 19. The reader will understand that it is possible for the head to stand in such position that free movement of the bolt 4 could be prevented by virtue of the corners being in the way. The engagement of the flares with such corners would tend to produce the preliminary turning mentioned thereby to set the steering post and head in position to be received by the wrench.

We claim:—

1. In combination with a revoluble member including a steering post and an ignition circuit, a non-circular head carried by the steering post, a casing through which the steering post extends and in which said head is occupied, means to fixedly secure the casing, contacts carried by said casing constituting terminals of said circuit, a bolt contained and guided by said casing and having a non-circular recess, flared jaws providing the approaches to said recess being capable of partially turning said steering post upon certain engagements with said head so that proper registration of said head with said recess may be effected, a slot formed in said bolt, a key-actuated eccentric operating in said slot to reciprocate the bolt either in the direction of the steering post or in the direction of the contacts, and a contactor carried by the bolt for bridging the contacts upon said latter action of the bolt.

2. In combination with a steering post, throttle and spark rods and an ignition circuit, a fixed casing carrying contacts at which said circuit terminates and through which said steering post and rods extend, a bolt occupying the casing having a bifurcated portion providing a recess, a non-circular head fixedly carried by the steering post, and a key-actuated eccentric for moving the bolt so that said recess engages the non-circular head to prevent turning of the steering post, said throttle rod having a non-circular portion to be engaged by the walls of said recess whereby to prevent turning of said throttle rod, and a contactor carried by the bolt to bridge the contacts and close the circuit upon reverse movement of the bolt by said eccentric.

3. A lock comprising a one-piece casing having an open end, a bolt fitted in and guided by the walls of said casing, a contactor carried by said bolt, flexible contacts to be engaged by said contactor upon appropriate movement of the bolt, a plate carrying the contacts and constituting a closure for said open end, and means to hold the plate in position upon the casing to prevent access to the interior, said means including ribs on the plate, grooves in the casing, and a rib on the plate to engage the interior wall of the casing upon having been forced across said wall in fitting the closure plate in place.

4. A lock comprising a fixed casing, a revoluble member traversing said casing and having a non-circular portion situated in said casing, a control rod traversing said casing having a non-circular portion located within the casing, a bolt occupying said casing being movable as an entirety in the direction of the axis of said member and rod and having recesses to receive said portions for locking engagement, and a key-actuated eccentric in operative engagement with said bolt to move it into locking and unlocking position.

5. A lock comprising a casing, a revoluble steering member having a non-circular portion and a control rod traversing said casing having a non-circular portion, a bolt within the casing having jaws which are flared at the confronting extremities, a portion of the jaws having a recess; and means to move the bolt into locking position whereat the recess engages the non-circular portion of the control rod, the number of faces on the first non-circular portion being such as to give said portion and steering member a preliminary turn when engaged by said flares necessasry for ultimate engagement of the jaws.

VICTOR L. GILPIN.
CHESTER R. WELLS.